July 26, 1960
L. A. RICHARDS
2,946,512
MEANS FOR AUTOMATIC IRRIGATION CONTROL
Filed May 17, 1954
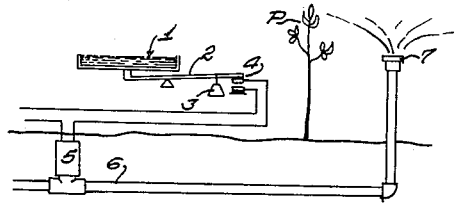
FIG. 1
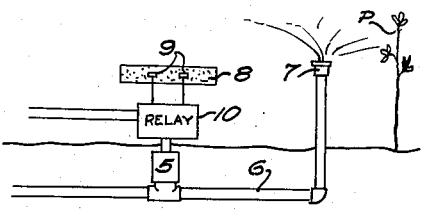
FIG. 2
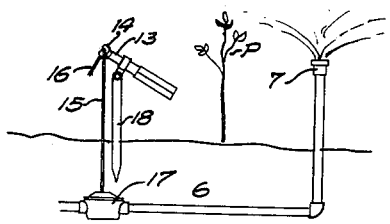
FIG. 3
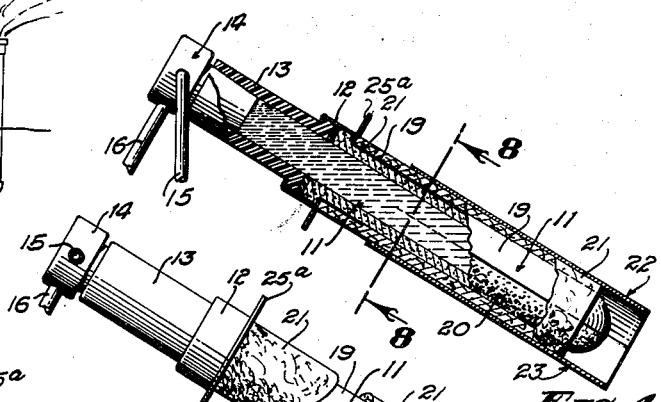
FIG. 4
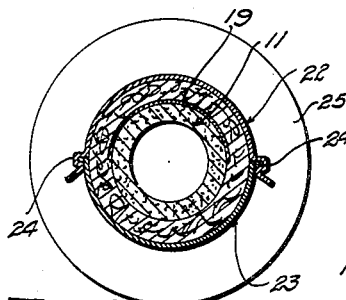
FIG. 8
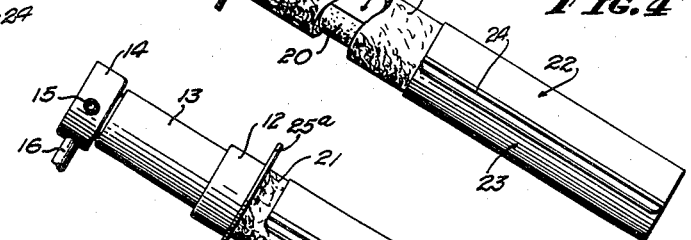
FIG. 5
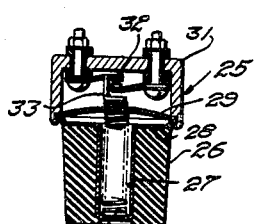
FIG. 9
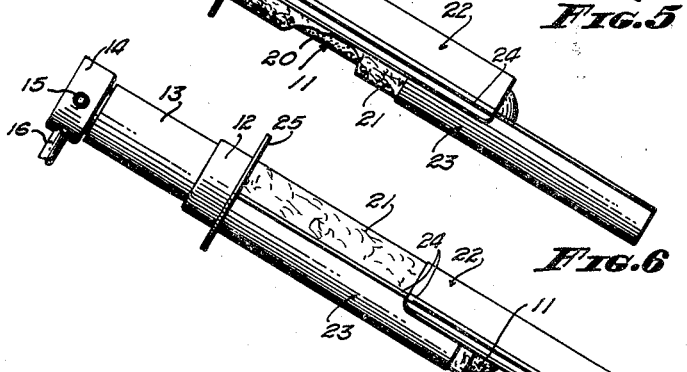
FIG. 6
FIG. 7
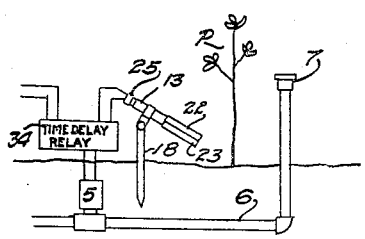
FIG. 10
INVENTOR.
LORENZO A. RICHARDS
BY
Lloyd Spencer United States Patent Office 2,946,512
Patented July 26, 1960

2,946,512
MEANS FOR AUTOMATIC IRRIGATION CONTROL

Lorenzo A. Richards, 4455 5th Ave., Riverside, Calif.

Filed May 17, 1954, Ser. No. 430,377

11 Claims. (Cl. 239—63)

My invention relates to means and method of automatic irrigation control and included in the objects of my invention are:

First, to provide a means and method of automatic irrigation control which utilizes the principal factors, such as solar radiation, relative humidity and air movement, that determine the evaporation power of the air and hence the factors which determine the loss of vapor from the vegetation and soil, to effect control of plant irrigation.

Second, to provide a means and method of automatic irrigation control wherein the evaporative power of the surrounding air in the region of the plants to be irrigated is utilized to evaporate water from the control means which in turn operates appropriate valves to irrigate the plants and the control means as well thereby to restore the control means to its initial condition as the plants receive their quota of water.

Third, to provide a means and method of automatic irrigation control which, in one form, utilizes a water filled sealed porous ceramic cell exposed to the evaporative power of the air in the region of the plants to cause a vacuum pressure to be created in the cell for the purpose of operating electric or hydraulic booster valves which control the water supply to the plants.

Fourth, to provide a means and method of automatic irrigation control wherein the On and Off periods may be independently or interdependently adjusted to meet the irrigation needs of the plants; thus providing a means and method which is capable of maintaining a wet condition approximating that of a rain forest for the growth of tropical and moisture demanding plants, or a dry condition more suitable for desert plants.

Fifth, to provide a means and method of this character which may employ, but is not limited to, the use of such valve means as are shown in my copending applications, Serial No. 34,946, filed June 24, 1948, for Method and Apparatus for Irrigating Plants, issued April 6, 1954, Patent No. 2,674,490 and Serial No. 382,231, filed September 24, 1953, for Automatic Irrigation System, now Patent No. 2,863,698, and the application of Edwin J. Hunter, Serial No. 322,120, filed November 22, 1952, for Automatic Irrigation Device, issued May 1, 1956, Patent No. 2,743,553.

With the above and other objects in view as may appear hereinafter, reference is directed to the accompanying drawings, in which:

Figure 1 is a diagrammatical view showing one form of apparatus suitable to my means and method of automatic irrigation control.

Figure 2 is another diagrammatical view showing another form of apparatus.

Figure 3 is another diagrammatical view showing a further form of apparatus.

Figure 4 is an enlarged partial sectional partial elevational view of the moisture sensitive device shown in Fig. 3, as arranged for a medium length of time for the On period, and a medium length of time for the Off period.

Figure 5 is an elevational view of the moisture sensitive device as arranged for a short On and a short Off period.

Figure 6 is an elevational view of the moisture sensitive device as arranged for wet conditions; that is, a short Off period and a long On period.

Figure 7 is an elevational view of the moisture sensitive device as arranged for dry conditions; that is, a long Off period and a short On period.

Figure 8 is an enlarged sectional view through 8—8 of Fig. 4.

Figure 9 is a sectional view of a vacuum pressure sensitive switch suitable for use in the moisture sensitive device.

Figure 10 is a diagrammatical view similar to Fig. 3 showing the vacuum pressure switch and indicating a time delay means for terminating the On period.

Reference is first directed to Fig. 1, which illustrates diagrammatically one form of apparatus for automatic irrigation control. In this apparatus, an evaporation pan 1 is mounted on one end of a balance means 2 having an adjustable weight 3 and arranged to close a pair of contacts 4 when all or a predetermined weight of water has evaporated from the pan. The contacts close a circuit through a solenoid valve 5 disposed in an irrigation supply line 6 controlling one or more sprinkler units 7.

The pan 1 is disposed so as to receive a proportion of water from the sprinkler unit 7 or from a supply flowing in proportion to the flow through the sprinkler unit 7 so that when the plants P irrigated by the sprinkler unit have received a quantity of water determined by that which is collected in the pan 1, the contacts 4 open, shutting off the water supply.

The water in the evaporation pan 1 is subjected to substantially the same conditions of solar radiation, relative humidity and air movement as the plants P and therefore regulates the frequency of the irrigation cycle in accordance with these factors which are the factors principally responsible for loss of moisture from the plants and the soil.

Reference is now directed to Fig. 2. This arrangement is essentially the same as in Fig. 1, except that in place of the evaporative pan and balance system a porous block 8 is used. Within or connected to the block are electrodes 9. The resistance of the circuit between the electrodes 9 is determined by the moisture content of the block. The electrodes are connected to a relay 10 preset to close a circuit to a solenoid valve 5 when the moisture content of the block diminishes to a predetermined minimum value and to open the circuit when the moisture content of the block rises to a predetermined maximum value.

The porous block, like the evaporative pan, is disposed in the region watered by the sprinkler unit 7 and is exposed to substantially the same solar radiation, relative humidity, and air movement as the plants so that the irrigation cycle is controlled by such factors as in the case of the first described apparatus.

Reference is now directed to Figs. 3 through 8. The apparatus here illustrated utilizes the phenomenon exhibited by a hollow porous liquid filled cell; namely that evaporation of water from the exterior of the cell will produce a vacuum pressure within the cell, and application of water to the exterior of the cell will restore the internal pressure to atmospheric pressure. This cycle may be repeated indefinitely without depleting water from within the cell providing the vacuum pressure therein does not exceed a critical value determined by the properties of water and the porous cell. Porous ceramic cells that will operate at vacuum values ranging between four and twelve pounds per square inch of vacuum pressure are suitable for my purpose. The porous ceramic cell may be in the form of a cylindrical tube 11 closed at one end and flanged at its other end. Secured to the flanged end by a connecting collar 12 is a sight tube 13 of transparent material. Within the extended end of the sight tube is fitted a pilot control valve 14. The pilot control valve is essentially a small vacuum sensitive valve connected to an inlet or control line 15 and to an outlet or bleed line 16. For example, the valve may be similar to the valve disclosed in the before mentioned application of Edwin J. Hunter, or in my copending applications also mentioned hereinbefore. The essential feature of such valve, for the purposes of my present invention, is that flows occurs when a predetermined minimum pressure occurs within the ceramic cell 11 and sight tube, and that the flow is stopped when the pressure within the ceramic cell reaches atmospheric pressure or some predetermined maximum pressure.

The sight tube 13 permits inspection to determine whether or not the cell is completely full of liquid, for over a period of time an accumulation of air may take place which will alter the operating cycle. It is merely necessary at such times to remove the valve and replenish with a few drops of water. In this regard, an automatic purging valve of the type shown in my copending application Serial Number 382,231 may be employed.

The pilot control line 15 is connected to a booster valve 17 which, for the purpose of this application may be considered as conventional. The booster valve controls a supply line 6 to a sprinkler unit or system 7, as in the first described arrangements. The moisture sensitive cell 11 is supported by a stake 18 having a suitable clamp means at its upper end. The stake is driven into the ground and the cell 11 is preferably mounted on an incline.

The entire surface of the cell may be porous, and be completely exposed; however, it is preferred to glaze or provide an impervious coating 19 over a portion of the surface of the cell, preferably in the upper half, leaving the lower half porous as indicated by 20. In addition, the cell is covered with a wick or jacket 21 of absorbent material. "Nylon" or asbestos is preferred. However, any capillary wetable material which will not deteriorate under exposure to weathering is satisfactory.

Fitted over the jacket 21 is a pair of complementary semi-cylindrical upper and lower evaporation shields 22 and 23. These may be formed of sheet material. The confronting axial margins of the shields may be provided with interlocking flange means 24 to permit relative axial displacement so that they may be adjusted as a unit along the cell 11 or adjusted individually as shown in Figs. 4 through 7.

Adjacent the connecting collar 12 there may be provided a disk or radial shield 25ª, to protect the porous section from irrigation water that is interrupted and drains from the sight tube 13 and valve 14 above.

Operation of my control means shown in Figs. 3 through 8 is as follows:

When the cell 11 is filled with water and the wick jacket 20 is saturated, the internal pressure will be equal to atmospheric pressure. As the moisture in the wick is depleted, a vacuum pressure will develop within the cell until it is sufficient to operate the pivot valve and booster valve and initiate the irrigation cycle. Irrigation will continue until the wick is resaturated, whereupon the pilot valve will close, thus closing the booster valve.

By adjustment of both shields 22 and 23 along the cell 11 as shown in Figs. 4 and 5, both the On and Off periods will be altered; thus, as shown in Fig. 4 an intermediate or medium On and Off period will occur; if a greater area of wick is exposed as in Fig. 5, both the On and Off periods will be shortened.

Now, if a long On period and a short Off period is desired for the control of moisture loving plants, the upper shield is adjusted upwardly and the lower shield is adjusted downwardly as viewed in Fig. 6. It will be seen that with this adjustment it is difficult to wet the wick, necessitating a long irrigation period, but that the exposure of its under side will permit quick evaporation causing a short Off period.

Conversely, if a short On period and long Off period is desired for the control of plants requiring more arid conditions the upper shield is adjusted downwardly and the lower shield is adjusted upwardly as viewed in Fig. 7. With this adjustment the wick is readily wetted, causing a short On period, but the lower shield opposite the porous section 20 of the cell tends to retain the moisture around the lower portion of the wick so that the Off period is relatively long.

Thus, it is possible to so adjust the control means that any desired irrigation cycle can be arranged to meet the needs of the plants; however, the off and on periods are not of fixed length but vary in accordance with the same factors that vary the water demand of the plants.

Reference is now directed to Figs. 9 and 10. Here illustrated is a vacuum operated switch 25 which may be substituted for the pilot valve shown in Figs. 3 through 7. The switch includes a plug 26 of yieldable material fitted on a tubular stem 27. One end of the stem is provided with a flange 28 covered by a diaphragm, preferably the snap-acting type, to form therewith a pressure sensitive chamber in communication through the tube with the interior of the cell 11. A spring 30 opposes the effect of vacuum pressure of the diaphragm.

Covering the diaphragm 29 is a cup-shaped housing 31 which may joint to and secure the margins of the flange 28 and diaphragm. Within the housing are a pair of spring contacts 32 so arranged that an arm 33 engaged by the diaphragm normally holds the contacts open, but permits the contacts to close when a predetermined vacuum pressure is established in the cell 11.

The pressure sensitive switch 25 is employed to operate a solenoid valve 5 as in the first described structures.

Under some circumstances it is desirable to control the ON period independently. Thus, as shown in connection with the pressure sensitive switch 25, a time delay switch 34 may be provided and so arranged in the circuit including the switch 25 and solenoid valve 5 that the sprinkler system is turned off after a predetermined period irrespective of the switch 25. This may be a complete control so that the ON period is fixed, or may be a partial or safety control operable only if the switch 25 should fail to function after a predetermined time. For example, the moisture sensitive cell might not receive sufficient water due to the change in the spray pattern from the sprinkler system being altered by wind or substantial change in water pressure.

Although such auxiliary control is shown as an electrical means, an analogous hydraulic time delay means may be employed in the arrangement shown in Fig. 3.

My method of plant irrigation control consists essentially in exposing a supply of water to solar radiation, relative humidity and air currents commensurate with that to which the plants to be irrigated are exposed; then initiating an irrigation On cycle when a predetermined quantity of water has evaporated; then returning to the water supply a proportion of the irrigation water; then terminating the irrigation On cycle when the water supply has been re-established.

A refinement of my method further includes the steps of altering the degree of exposure of the water or the quantity of water to be evaporated by the factors which determine the loss of water from the vegetation and soil to control the Off cycle of irrigation and to alter the On cycle of irrigation by altering the degree of exposure to the irrigation water.

A further refinement of my method includes the step of exercising supervisory control over the On period; or controlling the duration of the Off period and the initiation of the On period of irrigation by the factors which determine the loss of water from the vegetation then arbitrarily regulating the On period.

Although I have shown and described particular embodiments of my invention, I do not wish to be limited thereto but desire to include within the scope of my invention the novelty inherent in the appended claims.

I claim:

1. An irrigation control apparatus comprising: a hollow sealed cell having a porous wall and adapted to be filled with water, said cell tending on extraction of a portion of its water content through said porous wall to create a vacuum pressure within said cell; irrigation control means connected to the interior of said cell and responsive to pressure therein to initiate an irrigation on cycle when said pressure reaches a predetermined low value; a covering of water saturatable material in moisture transferring contact with the exterior of said porous cell; and support means connected to said cell and supporting the same above the ground whereby on exposure of the covering to the factors which evaporate moisture from the air exposed portions of plants, moisture is eventually extracted from said cell to initiate said irrigation on cycle; and movable means on said cell for variably shielding said saturable covering against exposure to air to vary the rate of evaporation therefrom.

2. An irrigation control device, comprising; a porous wall sealed cell adapted to be filled with water and tending, on migration of water through said porous wall to develop a vacuum pressure within said cell; a jacket of absorbent material in moisture transfer relation with said porous wall and arranged to be water saturated; and selectively movable shield means on said cell for variably exposing said jacket to the surrounding air thereby to regulate evaporation of water from said jacket; and a suction pressure actuated device communicating with the interior of said cell.

3. An apparatus for controlling irrigation, comprising: a sealed hollow porous cell tending to produce a vacuum pressure within said cell on evaporation of moisture from its exterior surface; means connected to said cell and supporting said cell in a fixed position above ground and exposed to air as well as exposed to those factors responsible for evopration of water from the air-exposed parts of plants to be irrigated; pressure-actuated means in communication with the interior of said cell and operable to initiate an on-cycle of plant irrigation when a predetermined vacuum pressure develops in said cell; and shield means secured on the exterior of said cell and adjustable thereon to vary the effective exposed area thereof.

4. An apparatus as set forth in claim 3, wherein: said pressure-actuated means includes a vacuum-responsive pilot valve connected to and subject to the vacuum pressure in said cell; and an irrigating valve controlled thereby.

5. An apparatus as set forth in claim 3, wherein: said initiating means includes a vacuum-responsive switch connected to and subject to the vacuum pressure in said cell; and a solenoid valve in electrical association therewith.

6. An apparatus for controlling irrigation, comprising: a sealed hollow porous cell tending to produce a vacuum pressure within said cell on evaporation of moisture from said cell, and tending to relieve said vacuum pressure when its exterior is rewetted; means connected to said cell supporting said cell above ground and exposed to air as well as exposed to those factors responsible for evaporation of water from the air-exposed parts of plants to be irrigated; pressure-responsive means in communication with the interior of said cell and operable to initiate an on-cycle of plant irrigation when a predetermined vacuum pressure develops in said cell; shield means on the exterior of said cell and adjustable thereon to vary the effective exposed area thereof; and means for rewetting the exterior of said cell to relieve said vacuum pressure.

7. An apparatus as set forth in claim 6 wherein: said initiating means includes a vacuum-responsive pilot valve exposed to the vacuum pressure in said cell; and an irrigating valve controlled thereby.

8. An apparatus as set forth in claim 6, wherein: said initiating means includes a vacuum-responsive switch exposed to the vacuum pressure in said cell; and a solenoid valve in electrical association therewith.

9. An apparatus for controlling irrigation, comprising: a sealed hollow porous cell tending to produce a vacuum pressure within said cell on evaporation of moisture from said cell, and tending to relieve said vacuum pressure when its exterior is rewetted; means connected to said cell and supporting said cell above ground and exposed to air as well as exposed to those factors responsible for evaporation of water from the air-exposed parts of plants to be irrigated; pressure-responsive means in communication with the interior of said cell and operable to initiate an on-cycle of plant irrigation when a predetermined quantity of water has evaporated from the exterior of said cell and for terminating said on-cycle when water is replenished thereon; shield means on the exterior of said cell and adjustable thereon to vary the effective exposed area thereof; and means for rewetting the exterior of said cell to cause said initiating means to terminate said on-cycle of irrigation.

10. An apparatus as set forth in claim 9 wherein: said initiating means includes a vacuum-responsive pilot valve subject to the vacuum pressure in said cell; and an irrigating valve controlled thereby.

11. An apparatus as set forth in claim 10, wherein: said initiating means includes a vacuum-responsive switch subject to the vacuum pressure in said cell; and a solenoid valve electrically connected therewith.

References Cited in the file of this patent

UNITED STATES PATENTS

| | | |
|---|---|---|
| 1,358,928 | Boehm | Nov. 16, 1920 |
| 2,004,194 | Mulhall | June 11, 1935 |
| 2,445,717 | Richards | July 20, 1942 |
| 2,577,337 | Lancaster | Dec. 4, 1951 |
| 2,695,976 | Hasenkamp | Nov. 30, 1954 |
| 2,785,007 | Jensen | Mar. 12, 1957 |